United States Patent
Leatherman et al.

(10) Patent No.: US 8,306,380 B2
(45) Date of Patent: Nov. 6, 2012

(54) METHODS AND DEVICES FOR CABLE INSERTION INTO LATCHED-DUCT CONDUIT

(75) Inventors: Patrick Leatherman, Vale, NC (US); Dean Yamasaki, Newton, NC (US); Greg Williams, Hickory, NC (US)

(73) Assignee: Draka Comteq, B.V., Amsterdam (NL)

( * ) Notice: Subject to any disclaimer, the term of this patent is extended or adjusted under 35 U.S.C. 154(b) by 239 days.

(21) Appl. No.: 12/881,598

(22) Filed: Sep. 14, 2010

(65) Prior Publication Data

US 2011/0064371 A1 Mar. 17, 2011

Related U.S. Application Data

(60) Provisional application No. 61/242,287, filed on Sep. 14, 2009.

(51) Int. Cl.
*G02B 6/46* (2006.01)

(52) U.S. Cl. ......... 385/134; 385/136; 385/137; 385/100

(58) Field of Classification Search ................. 385/134, 385/135, 136, 137, 138, 139, 147, 100
See application file for complete search history.

(56) References Cited

U.S. PATENT DOCUMENTS

| | | | |
|---|---|---|---|
| 4,838,643 A | 6/1989 | Hodges et al. | |
| 4,911,510 A * | 3/1990 | Jenkins | 385/136 |
| 5,013,125 A * | 5/1991 | Nilsson et al. | 385/137 |
| 5,039,196 A * | 8/1991 | Nilsson | 385/136 |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,917,982 A * | 6/1999 | Vargas et al. | 385/134 |
| 5,982,968 A | 11/1999 | Stulpin | |
| 5,995,699 A * | 11/1999 | Vargas et al. | 385/134 |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,493,491 B1 | 12/2002 | Shen et al. | |
| 6,603,907 B2 * | 8/2003 | Stark | 385/100 |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,736,156 B2 * | 5/2004 | Beals et al. | 137/15.04 |
| 6,749,446 B2 | 6/2004 | Nechitailo | |

(Continued)

FOREIGN PATENT DOCUMENTS

EP 1921478 A1 5/2008

(Continued)

*Primary Examiner* — Brian Healy
(74) *Attorney, Agent, or Firm* — Summa, Additon & Ashe, P.A.

(57) ABSTRACT

Disclosed are fiber-optic-cable insertion tools and related methods for inserting fiber optic cables into latched-duct conduit systems.

18 Claims, 5 Drawing Sheets

U.S. PATENT DOCUMENTS

| | | |
|---|---|---|
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 2003/0002842 A1* | 1/2003 | Lepley et al. ............... 385/138 |
| 2005/0047735 A1* | 3/2005 | Morris ........................ 385/100 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0064371 A1 | 3/2011 | Leatherman et al. |

FOREIGN PATENT DOCUMENTS

| | | |
|---|---|---|
| WO | 2009/062131 A1 | 5/2009 |

\* cited by examiner

METHODS AND DEVICES FOR CABLE INSERTION INTO LATCHED-DUCT CONDUIT

CROSS-REFERENCE TO PRIORITY APPLICATION

This application claims the benefit of commonly assigned U.S. Patent Application No. 61/242,287 for Methods and Devices for Cable Insertion into Latched-Duct Conduit (filed Sep. 14, 2009), which is hereby incorporated by reference in its entirety.

FIELD OF THE INVENTION

The present invention relates to a tool and an associated method for installing fiber optic cables into conduit systems.

BACKGROUND

Optical fibers provide advantages over conventional communications lines. As such, fiber optic cables are becoming increasingly popular.

Fiber optic cables have traditionally been installed in Multi-Dwelling Units (MDU) (e.g., apartment complexes) by positioning the cables within pre-installed conduit systems, such as latched-duct conduit systems. In this regard, a latched-duct conduit is typically installed in sections near the ceiling. For greater distances, multiple sections are placed in series.

Fiber optic cables are typically installed by hand into the pre-installed latched-duct conduit systems. The conventional installation method requires the installer to: (i) position an appropriately sized ladder near the conduit; (ii) climb the ladder to the appropriate height to reach the latched-duct conduit; (iii) open the latched-duct conduit by hand to create a gap that is sufficiently wide to allow cable entry; (iv) feed the cable by hand into the latched-duct conduit for the portion of the conduit that is within the safe reach of the installer; (v) close and secure by hand the latch mechanism of the latched-duct conduit's cover door; and (vi) reposition the ladder and repeat the process until the cable is fully installed.

As will be recognized by those having ordinary skill in the art, such a conventional installation method is time consuming and labor intensive.

Therefore, there is a need for more efficient tools and methods that improve the installation of fiber optic cable into latched-duct conduit systems.

SUMMARY

Accordingly, in one aspect, the present invention embraces a fiber-optic-cable insertion tool that facilitates efficient installation of fiber optic cable into latched-duct conduit systems.

In an exemplary embodiment, the fiber-optic-cable insertion tool includes a nose guide for opening a latched-duct conduit (e.g., to facilitate its receipt of a fiber optic cable). The fiber-optic-cable insertion tool also includes a grooved trailing guide, which is typically used for positioning the fiber optic cable into the latched-duct conduit. The fiber-optic-cable insertion tool further includes a central tool body defining a transverse cable guide slot that directs a fiber optic cable to the grooved trailing guide (i.e., to facilitate installation of the fiber optic cable into the latched-duct conduit).

In a related aspect, the present invention embraces a time-saving method for installing fiber optic cables into latched-duct conduit systems using the aforementioned fiber-optic-cable insertion tool. In this regard, the insertion tool is typically secured to an extension tool to facilitate cable installation.

In an exemplary method for installing a fiber optic cable, the nose guide of a fiber-optic-cable insertion tool is seated into a latched-duct conduit. The fiber-optic-cable insertion tool is advanced along the latched-duct conduit. The fiber optic cable is routed through the cable guide slot to the grooved trailing guide. The fiber optic cable is installed from the grooved trailing guide into the latched-duct conduit.

The foregoing, as well as other objectives and advantages of the invention and the manner in which the same are accomplished, are further specified within the following detailed description and its accompanying figures.

DETAILED DESCRIPTION

Figure 1:
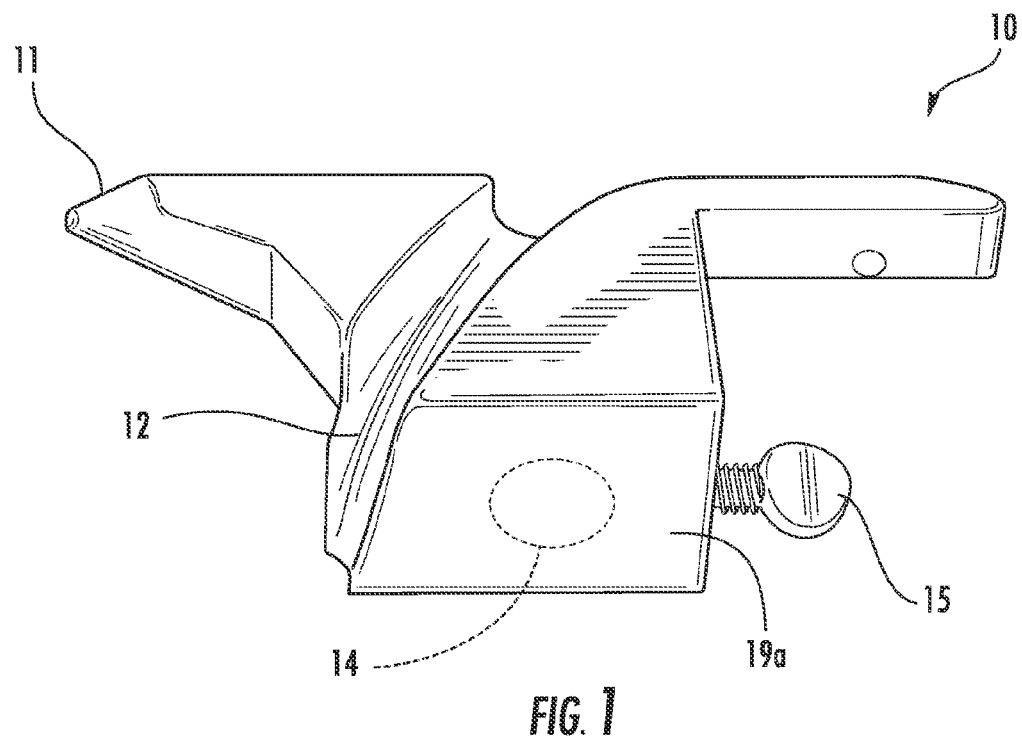
FIG. 1 schematically depicts one side of an exemplary fiber-optic-cable insertion tool according to the present invention.
Figure 2:
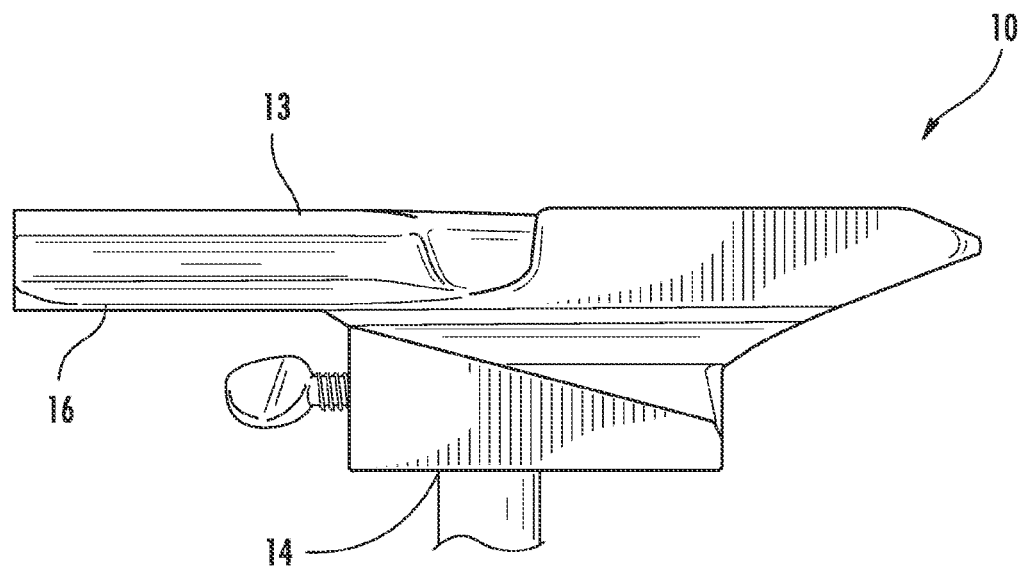
FIG. 2 schematically depicts another side of an exemplary fiber-optic-cable insertion tool according to the present invention.
Figure 3:
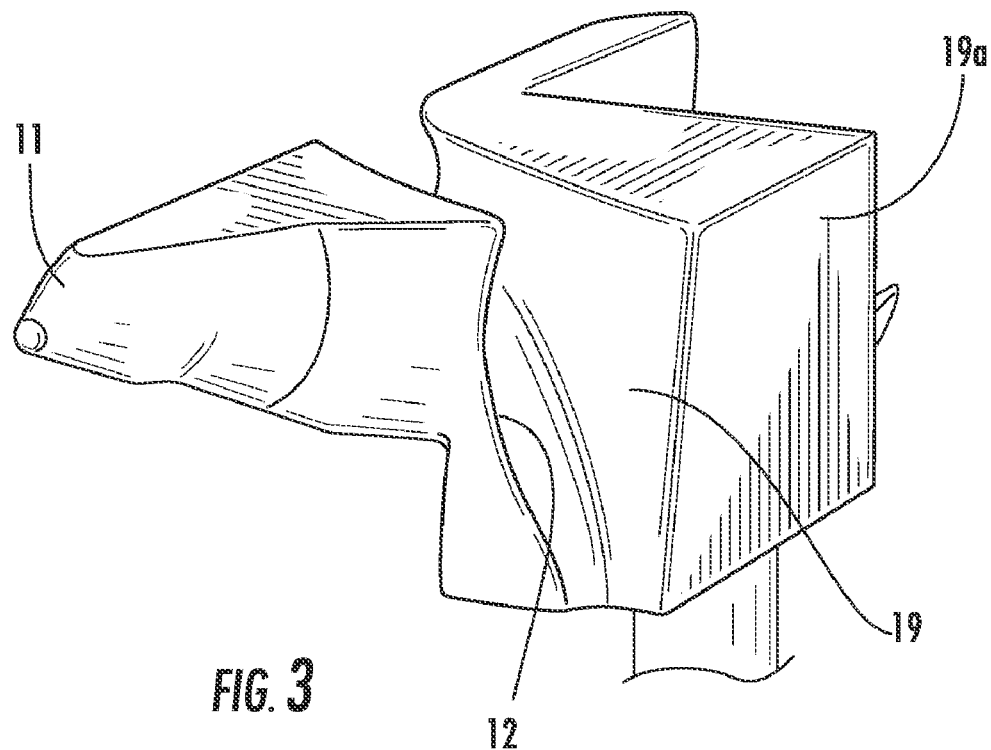
FIG. 3 schematically depicts an angled front view of an exemplary fiber-optic-cable insertion tool according to the present invention.
Figure 4:
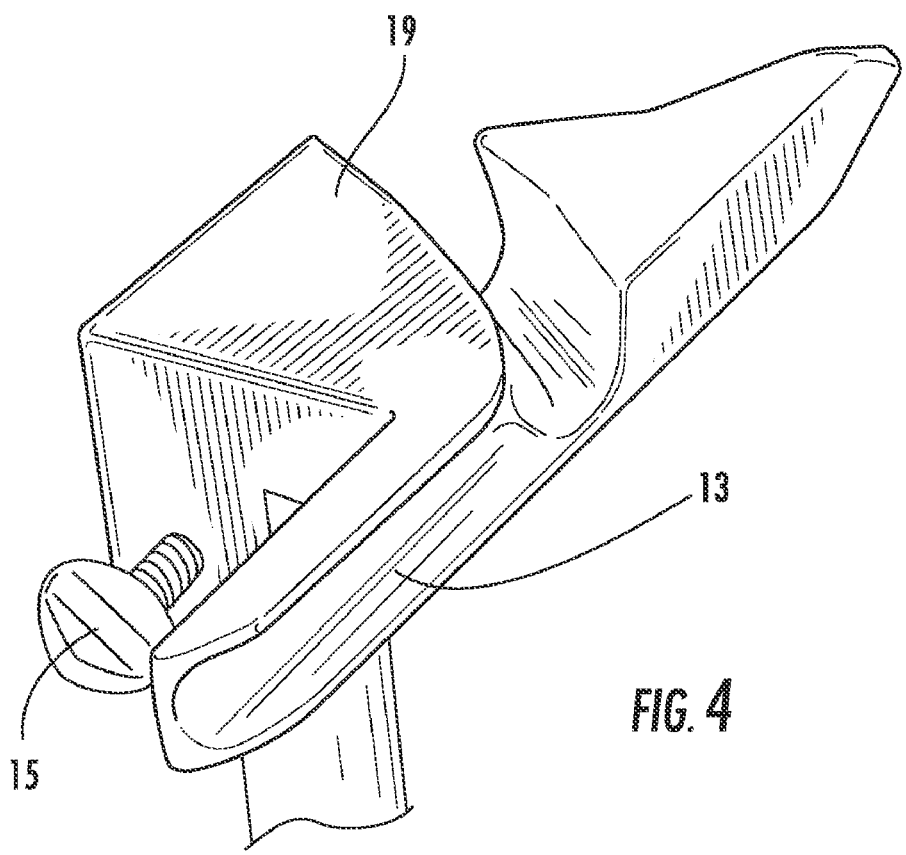
FIG. 4 schematically depicts an angled rear view of an exemplary fiber-optic-cable insertion tool according to the present invention.

The present fiber-optic-cable insertion tool facilitates installation of a fiber optic cable into a latched-duct conduit.

As depicted in FIGS. 1-5, an exemplary fiber-optic-cable insertion tool (10) includes a nose guide (11) for opening a latched-duct conduit. In the exemplary embodiment depicted in FIGS. 1-5, the nose guide (11) has a conical-shaped torpedo-nose cone. As shown in FIGS. 1-5, the nose guide (11) further includes a flange to promote seating of the nose guide (11) within the latched-duct conduit. Those having ordinary skill in the art will appreciate, however, that the nose guide (11) need not have a torpedo shape. That said, the nose guide (11) is typically capable of seating the insertion tool (10) into the latched-duct conduit and opening the latched-duct conduit as the insertion tool (10) is advanced along the latched-duct conduit. The nose guide (11) can also be used to open the latched-duct conduit's cover door before the insertion tool (10) is seated in latched-duct conduit.

The nose guide (11) is connected to a central tool body (19) that includes a fiber-optic-cable guide slot (12). As depicted in FIGS. 1-5, the fiber-optic-cable guide slot (12) is typically defined (e.g., machined) at a transverse angle across the central tool body (19).

The fiber-optic-cable guide slot (12) directs a fiber optic cable to a grooved trailing guide (13), which is connected to the central tool body (19), opposite the nose guide (11). In other words, the grooved trailing guide (13) typically is connected to the rear portion of the central tool body (19), whereas the nose guide (11) typically is connected to the front portion of the central tool body (19). Moreover, the grooved trailing guide (13) is typically positioned on the "wall side" of the insertion tool (10) (i.e., the side of the insertion tool that faces a wall during cable installation).

As depicted in FIGS. 1-5, the grooved trailing guide (13) includes a U-shaped groove (or slot) that directs and positions the fiber optic cable into the latched-duct conduit. The grooved trailing guide (13) typically has sufficient length to hold the optical-fiber cable within the latched-duct conduit until the latched-duct conduit is closed around the optical-fiber cable. In this regard, the grooved trailing guide (13) may be tapered at its end (e.g., having a tapered end 16) to facilitate final placement of the fiber optic cable into the latched-duct conduit. For instance, tapering of the grooved trailing guide (13) promotes closure of the latched-duct conduit around the fiber optic cable.

The central tool body (19) typically includes a flat side (19a) located opposite the grooved trailing guide (13). In other words, the flat side (19a) is typically located on the "hallway side" of the insertion tool (10) (i.e., the side of the insertion tool that faces away from the wall during cable installation). The flat side (19a) of the central tool body (19) may aid in relatching the latched-duct conduit. For example, the flat side (19a) can be used to press or tap the latched-duct conduit's cover door so that the latch engages.

Figure 5:
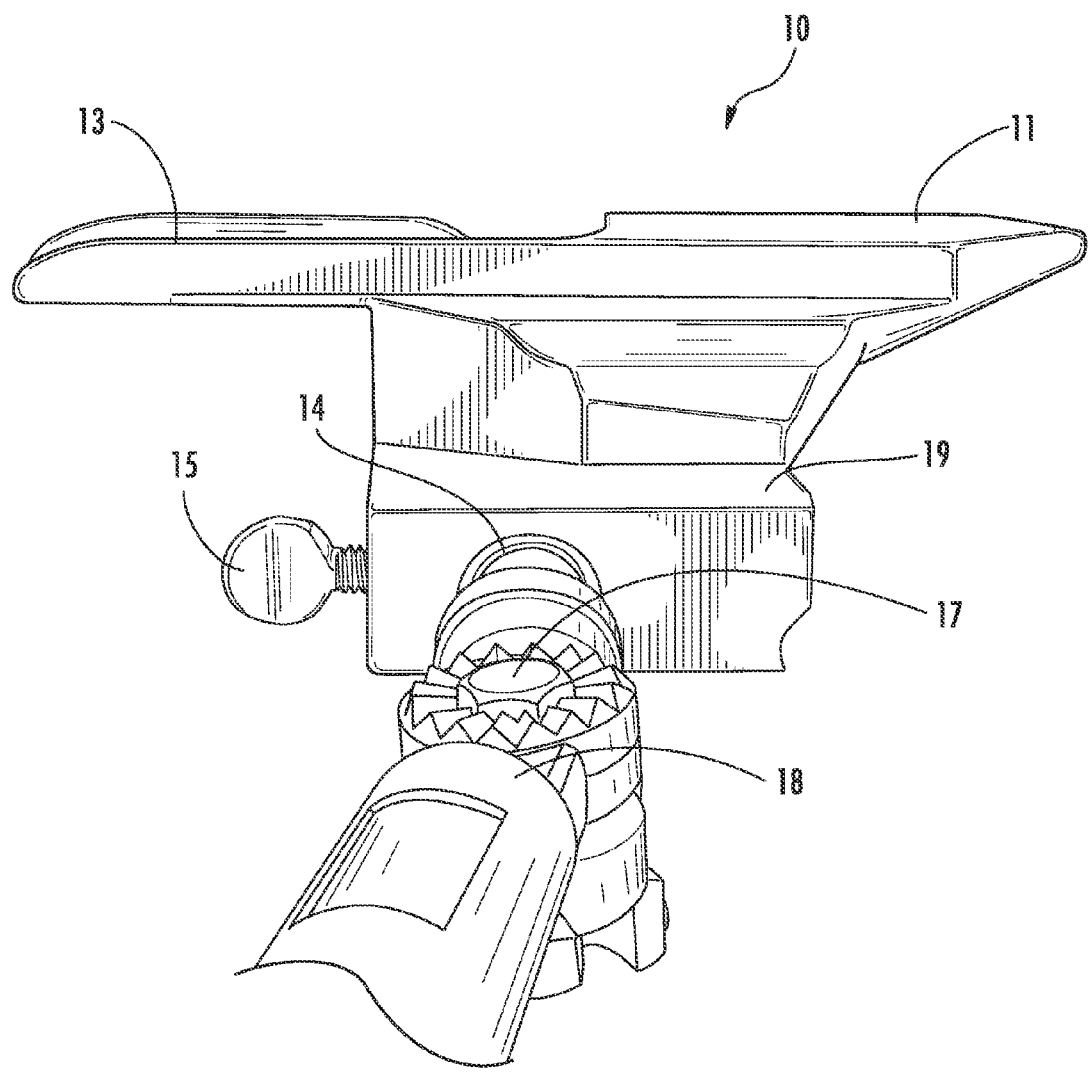
FIG. 5 schematically depicts the bottom of an exemplary fiber-optic-cable insertion tool according to the present invention.

In an exemplary embodiment, the central tool body (19) includes a pole-mount recess (14) for receiving an extension pole having a fixed or adjustable length. As depicted in FIGS. 1 and 5, the machined, pole-mount recess (14) works with a set screw (15) to secure an extension pole (18) to the central tool body and thus to the fiber-optic-cable insertion tool (10). The use of an extension pole simplifies the installation of a fiber optic cable by eliminating the need for a ladder.

Figure 6:
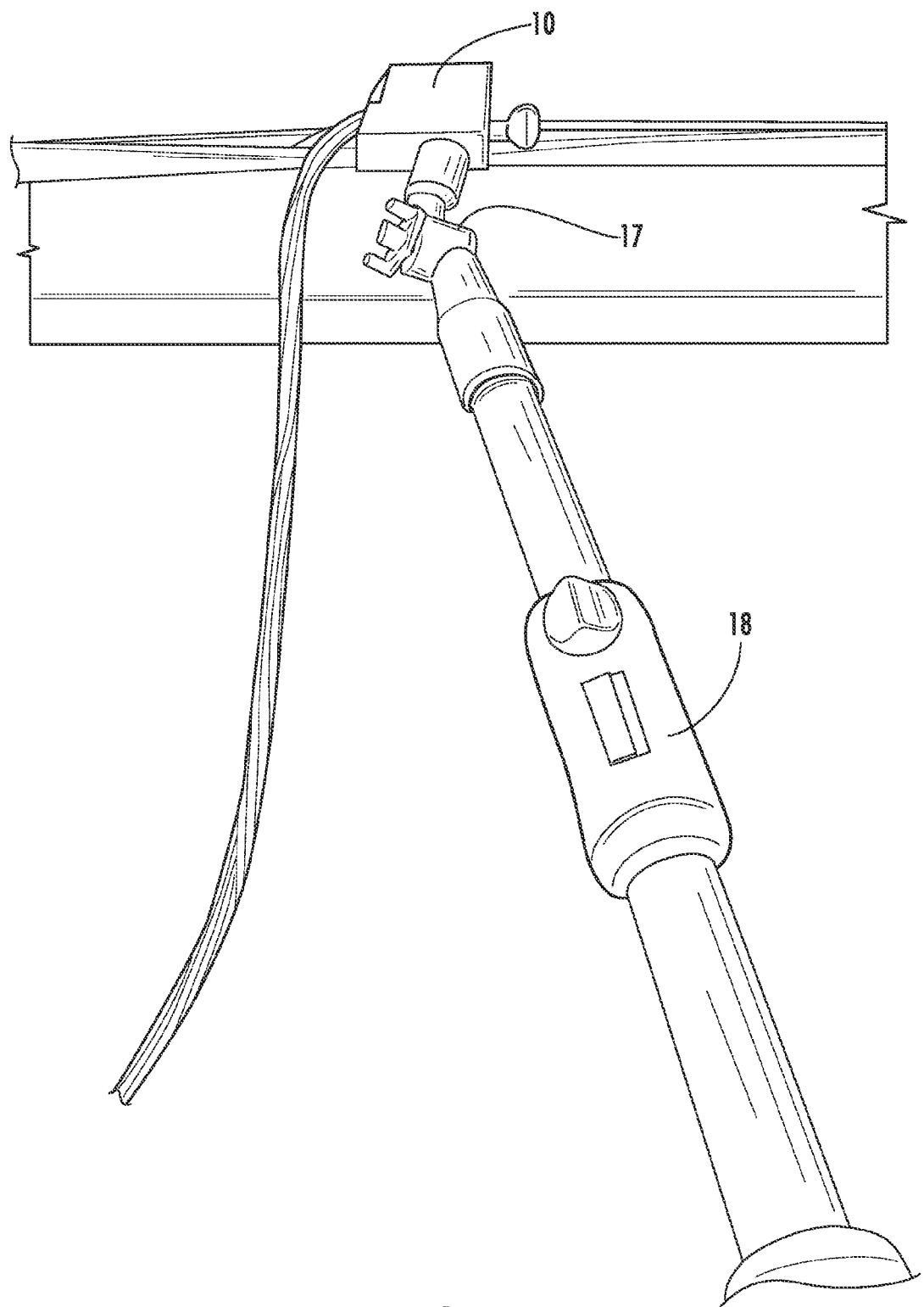
FIG. 6 schematically depicts an extension arm being employed with an exemplary fiber-optic-cable insertion tool to install fiber optic cables into a latched-conduit system.
Figure 7:
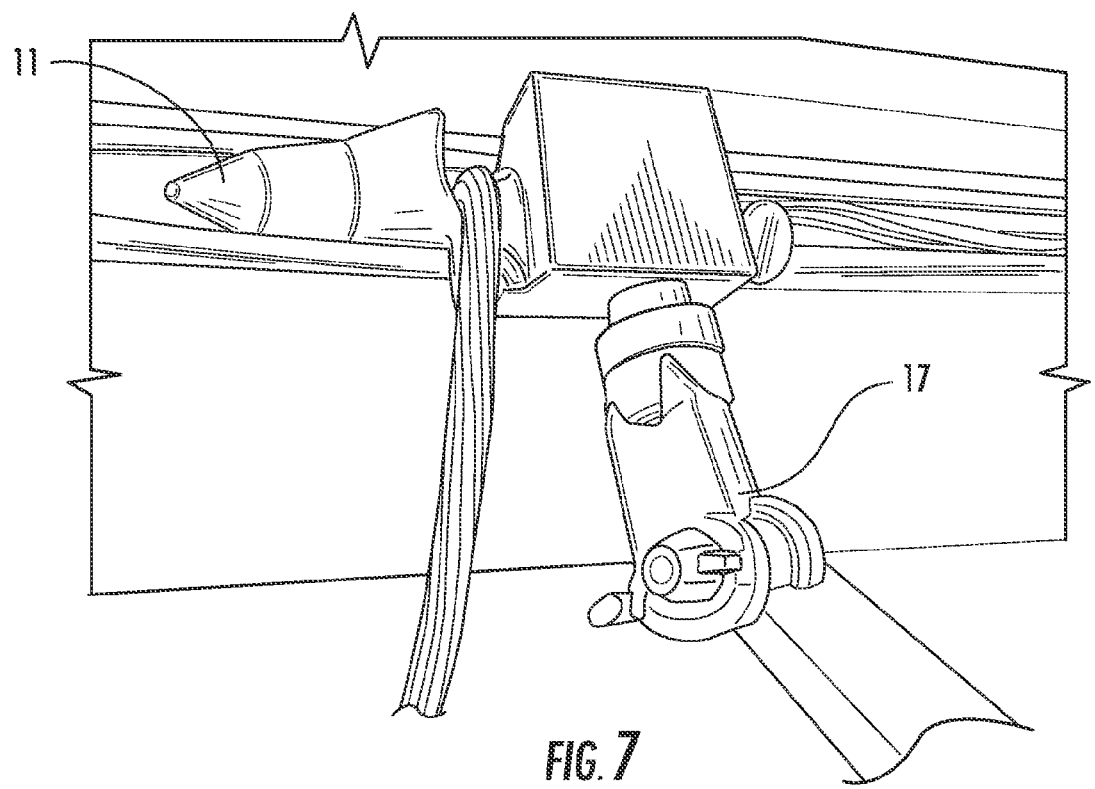
FIG. 7 schematically depicts an exemplary fiber-optic-cable insertion tool being employed to install fiber optic cables into a latched-conduit system.
Figure 8:
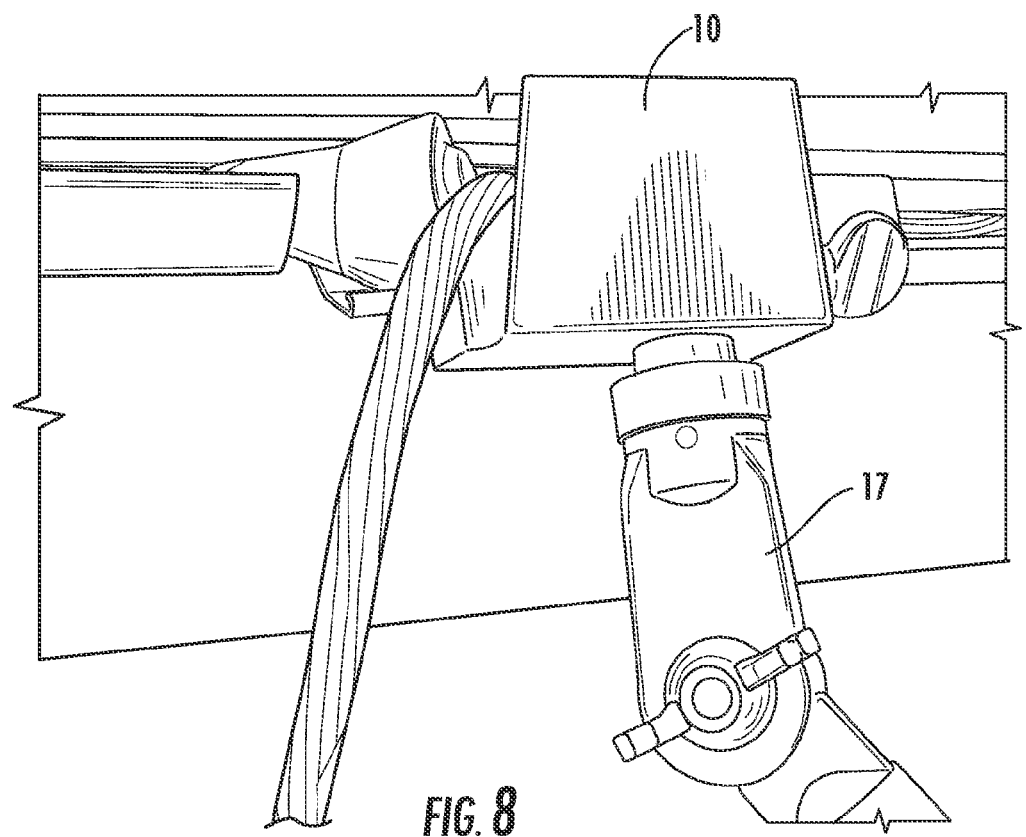
FIG. 8 schematically depicts an exemplary fiber-optic-cable insertion tool being employed to install fiber optic cables across a gap (e.g., a gap of about 0.125 inch) between two adjacent sections of a latched-duct conduit.

As depicted in FIGS. 6-8, a mechanical swivel, such as an elbow (17), may be inserted into the pole-mount recess (14) and secured in place by the set screw (15). The elbow (17) may be mounted upon an appropriately sized extension pole (18) (e.g., using threaded attachments).

The foregoing notwithstanding, those having ordinary skill in the art will appreciate that an extension pole may be secured to the fiber-optic-cable insertion tool (10) using other techniques. For example, the extension pole (18) may be clamped, bolted, welded, or otherwise secured (e.g., temporarily or permanently secured) to the fiber-optic-cable insertion tool (10). By way of further example, an extension pole (18) may be secured to the insertion tool (10) using a mechanical fastener and/or an adhesive (e.g., an epoxy adhesive). In a particular embodiment, an extension pole (18) may be secured to the insertion tool (10) via a threaded pole-mount recess (14) in conjunction with a threaded extension pole (18) or a threaded elbow (17).

The fiber-optic-cable insertion tool (10) facilitates the installation of fiber optic cables into latched-duct-conduit systems as the fiber-optic-cable insertion tool (10) is advanced by an installer along a latched-duct conduit. As depicted in FIGS. 1-5, the fiber-optic-cable insertion tool (10) is configured for installing an optical-fiber cable in a "right to left" direction. That said, the fiber-optic-cable insertion tool (10) alternatively may be configured to facilitate a "left to right" installation of an optical-fiber cable. In other words, the fiber-optic-cable insertion tool may be a mirror image of the fiber-optic-cable insertion tool (10) depicted in FIGS. 1-5.

Those having ordinary skill in the art will appreciate that the dimensions of latched-duct-conduit systems can vary. Accordingly, insertion tools of varying sizes are within the scope of the present invention.

As noted, a latched-duct conduit is often installed in sections (e.g., a series of eight-foot conduit sections), which can be separated by a small gap (e.g., a gap of about 0.125 inch or so). As depicted in FIG. 8, the fiber-optic-cable insertion tool (10) is capable of making the transition across a gap between adjacent sections of a latched-duct conduit, thereby reducing installation time.

During cable installation, the latched-duct conduit is separated through the insertion and subsequent seating of the nose guide (11) into the lacked-duct conduit. As the fiber-optic-cable insertion tool (10) is advanced along a pre-installed latched-duct-conduit system, the fiber optic cable is routed through the fiber-optic-cable guide slot (12) to the grooved trailing guide (13) and into the latched-duct conduit.

In particular, the grooved trailing guide (13) holds the fiber optic cable in position as the latched-duct conduit closes behind the advancing fiber-optic-cable insertion tool (10). As noted, the tapered end (16) of the grooved trailing guide (13) aids in returning the latched-duct conduit to its closed position.

In one installation method, the fiber optic cable may be unspooled on the floor before it is routed into the latched-duct conduit through the fiber-optic-cable guide slot (12) and the grooved trailing guide (13). In an alternative installation method, a spooled fiber optic cable may be incorporated into an extension pole assembly (not pictured), unwound from a spool, and guided through stringers (e.g., similar to guides on a fishing pole) up the extension pole (18) to the fiber-optic-cable guide slot (12).

The tools and methods for installing optical-fiber cables as described herein are applicable to various optical fiber cable designs (e.g., simplex cables, such as MDU cables). The tools and methods described herein may also be used to install other types of cables such as coaxial cables (e.g., RG-6 coaxial cables).

Moreover, the foregoing methods of using the fiber-optic-cable insertion tool to install fiber optic cables allows the installation process to be performed faster and with less effort than with the traditional hand-installation method. A single installation technician using an appropriately sized extension pole may insert the fiber optic cable product by passing the tool through the conduit and advancing the tool by walking forward. Installation time and labor costs are therefore reduced.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098, 804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for a Optical Fiber Amplifier Having Nanostructures, filed Feb. 19, 2010, (Burow et al.); U.S. patent application Ser. No. 12/765,182 for a Multimode Fiber, filed Apr. 22, 2010, (Molin et al.); and U.S. patent application Ser. No. 12/794,229 for a Large Bandwidth Multimode Optical Fiber Having a Reduced Cladding Effect, filed Jun. 4, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.);

U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); and U.S. patent application Ser. No. 12/843,116 for a Tight-Buffered Optical Fiber Unit Having Improved Accessibility, filed Jul. 26, 2010, (Risch et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A fiber-optic-cable insertion tool for installing fiber optic cable into latched duct conduit, comprising:
   a central tool body having a front portion and a rear portion;
   a nose guide for opening a latched-duct conduit, said nose guide being connected to said front portion of said central tool body; and
   a grooved trailing guide for directing and positioning a fiber optic cable into a latched-duct conduit, said grooved trailing guide being connected to said rear portion of said central tool body;
   wherein said central tool body defines a fiber-optic-cable guide slot from said front portion of said central tool body to said rear portion of said central tool body, said fiber-optic-cable guide slot being transversely angled across said central tool body.

2. A fiber-optic-cable insertion tool according to claim 1, wherein said nose guide comprises a conical-shaped torpedo-nose cone.

3. A fiber-optic-cable insertion tool according to claim 1, wherein said nose guide comprises a flange to facilitate seating of said nose guide into a latched-duct conduit.

4. A fiber-optic-cable insertion tool according to claim 1, wherein said grooved trailing guide comprises a tapered end that facilitates placement of the fiber optic cable into a latched-duct conduit.

5. A fiber-optic-cable insertion tool according to claim 1, wherein said central tool body defines an opening for receiving an extension pole.

6. A fiber-optic-cable insertion tool according to claim 5, comprising a means for securing the extension pole to said central tool body.

7. A fiber-optical-cable insertion tool according to claim 1, wherein said central tool body defines a flat side that facilitates the closing of a latched-duct conduit's cover door.

8. A fiber-optical-cable insertion tool according to claim 1, wherein said nose guide defines a flange that promotes the seating of the nose guide within a latched-duct conduit.

9. A method for installing a fiber optic cable into a latched-duct conduit using a fiber-optic-cable insertion tool according to claim 1, comprising:
   seating the nose guide into a latched-duct conduit;
   advancing the fiber-optic-cable insertion tool along the latched-duct conduit;
   routing a fiber optic cable through the fiber-optic-cable guide slot to the grooved trailing guide; and
   installing the fiber optic cable from the grooved trailing guide into the latched-duct conduit.

10. A method according claim 9, wherein the step of advancing the fiber-optic-cable insertion tool comprises advancing the fiber-optic-cable insertion tool forward along the latched-duct conduit such that the nose guide opens the latched-duct conduit to facilitate the installation of the fiber optic cable into the latched-duct conduit.

11. A method according claim 9, wherein the step of installing the fiber optic cable comprises at least partially closing the latched-duct conduit around the fiber optic cable, thereby securing the fiber optic cable within the latched-duct conduit.

12. A fiber-optic-cable insertion tool, comprising:
   a central tool body having a front portion and a rear portion, said central tool body defining a cable guide slot from said front portion of said central tool body to said rear portion of said central tool body, the cable guide slot being transversely angled across said central tool body;
   a nose guide connected to said front portion of said central tool body, said nose guide having a conical-shaped nose cone; and
   a grooved trailing guide connected to said rear portion of said central tool body and in communication with said cable guide slot.

13. A fiber-optic-cable insertion tool according to claim 12, wherein said nose guide comprises a flange to facilitate seating of said nose guide into a latched-duct conduit.

14. A fiber-optic-cable insertion tool according to claim 12, wherein said grooved trailing guide comprises a tapered end that facilitates placement of the fiber optic cable into a latched-duct conduit.

15. A fiber-optic-cable insertion tool according to claim 12, wherein said central tool body defines an opening for receiving an extension pole.

16. A fiber-optic-cable insertion tool according to claim 12, comprising a means for securing an extension pole to said central tool body.

17. A method for installing a fiber optic cable into a latched-duct conduit using a fiber-optic-cable insertion tool according to claim 10, comprising:
- seating the nose guide into a latched-duct conduit;
- advancing the fiber-optic-cable insertion tool along the latched-duct conduit;
- routing a fiber optic cable through the cable guide slot to the grooved trailing guide;
- installing the fiber optic cable from the grooved trailing guide into the latched-duct conduit; and
- at least partially closing the latched-duct conduit around the fiber optic cable.

18. A method according claim 17, wherein the step of advancing the fiber-optic-cable insertion tool comprises advancing the fiber-optic-cable insertion tool forward along the latched-duct conduit such that the nose guide opens the latched-duct conduit to facilitate the installation of the fiber optic cable into the latched-duct conduit.

* * * * *